United States Patent [19]

Ueda

[11] Patent Number: 4,886,720

[45] Date of Patent: Dec. 12, 1989

[54] PHOTOSENSITIVE MEDIUM HAVING A STYRYL CHARGE TRANSPORT MATERIAL

[75] Inventor: Hideaki Ueda, Kawanishi, Japan

[73] Assignee: Minolta Camera Kabushiki Kaisha, Osaka, Japan

[21] Appl. No.: 90,911

[22] Filed: Aug. 31, 1987

[51] Int. Cl.⁴ ............................................. G03G 5/10
[52] U.S. Cl. .......................... 430/58; 430/64, 430/66
[58] Field of Search ........................ 430/58, 59, 72, 76, 430/64, 66

[56] References Cited

U.S. PATENT DOCUMENTS

| | | | |
|---|---|---|---|
| 3,189,447 | 6/1965 | Neugebauer et al. | 430/76 |
| 3,331,687 | 7/1967 | Kosche | 430/72 |
| 3,820,989 | 6/1974 | Rule et al. | 430/73 |
| 3,873,311 | 3/1975 | Contois et al. | 430/72 |
| 3,873,312 | 3/1975 | Contois et al. | 430/73 |
| 3,972,717 | 8/1976 | Wiedemann | 430/58 |
| 3,992,203 | 11/1976 | Horhold et al. | 252/501 |
| 4,045,220 | 8/1977 | Contois et al. | 430/70 |
| 4,105,447 | 8/1978 | Fox | 430/70 |
| 4,195,990 | 4/1980 | Staudenmayer et al. | 430/70 |
| 4,334,001 | 6/1982 | Horie et al. | 430/83 |
| 4,362,798 | 12/1982 | Anderson et al. | 430/59 |
| 4,399,208 | 8/1983 | Takasu et al. | 430/59 |
| 4,420,548 | 12/1983 | Sakai et al. | 430/59 |
| 4,515,883 | 5/1985 | Sasaki | 430/58 |
| 4,606,988 | 8/1986 | Sasaki | 430/59 |
| 4,619,879 | 10/1986 | Kakuta et al. | 430/58 |
| 4,622,278 | 11/1986 | Kondo et al. | 430/59 |
| 4,622,280 | 11/1986 | Makino et al. | 430/70 |
| 4,642,280 | 2/1987 | Ueda | 430/73 |

FOREIGN PATENT DOCUMENTS

| | | |
|---|---|---|
| 48-28299 | 8/1973 | Japan . |
| 54-59143 | 5/1979 | Japan . |
| 56-29245 | 3/1981 | Japan . |
| 56-50333 | 5/1981 | Japan . |
| 56-26020 | 6/1981 | Japan . |
| 57-82844 | 5/1982 | Japan . |
| 57-47888 | 10/1982 | Japan . |
| 58-58550 | 4/1983 | Japan . |
| 58-65440 | 4/1983 | Japan . |
| 58-65441 | 4/1983 | Japan . |
| 58-98736 | 6/1983 | Japan . |
| 58-160957 | 9/1983 | Japan . |
| 58-163946 | 9/1983 | Japan . |
| 58-198043 | 11/1983 | Japan . |
| 59-165064 | 9/1984 | Japan . |

(List continued on next page.)

Primary Examiner—John L. Goodrow
Attorney, Agent, or Firm—Burns, Doane, Swecker & Mathis

[57] ABSTRACT

The present invention provides a photosensitive medium for electrophotography comprising a styryl compound represented by the following formula (I) or (II):

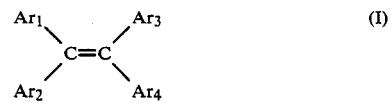

(I)

wherein $Ar_1$ is a substituted aryl group and $Ar_2$, $Ar_3$, $Ar_4$ are each an aryl group which may have a substituent;

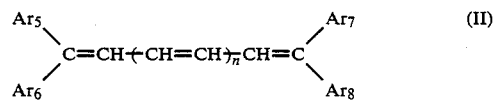

(II)

wherein both $Ar_5$ and $Ar_7$ substituted aryl groups and $Ar_6$ and $Ar_8$ are each an aryl group which may have a substituent, and n is 0 or 1.

The use of the present compound inhibits the light fatigue of the photosensitive medium effectively and renders the medium repeatedly usable with a diminished surface potential reduction, reduced rise of residual potential; and lesser sensitivity variation, enabling the medium to exhibit stable electrophotographic characteristics and high sensitivity to afford sharp copy images.

13 Claims, 1 Drawing Sheet

FOREIGN PATENT DOCUMENTS

| | | |
|---|---|---|
| 59-170843 | 9/1984 | Japan . |
| 59-182458 | 10/1984 | Japan . |
| 60-19151 | 1/1985 | Japan . |
| 60-19154 | 1/1985 | Japan . |
| 60-98437 | 6/1985 | Japan . |
| 60-232553 | 11/1985 | Japan . |
| 60-254047 | 12/1985 | Japan . |
| 61-32062 | 2/1986 | Japan . |
| 61-43754 | 3/1986 | Japan . |
| 61-69070 | 4/1986 | Japan . |
| 61-210364 | 9/1986 | Japan . |
| 62-30255 | 2/1987 | Japan . |
| 62-38472 | 2/1987 | Japan . |
| 62-272272 | 11/1987 | Japan . |

PHOTOSENSITIVE MEDIUM HAVING A STYRYL CHARGE TRANSPORT MATERIAL

BACKGROUND OF THE INVENTION

The present invention relates to photosensitive media for electrophotography, and more particularly to an electrophotographic photosensitive medium having a photosensitive layer which comprises a styryl compound as a main component.

Widely known as photosensitive media for electrophotography are those of function-divided types comprising a charge generating layer and a charge transporting layer which are formed on an electrically conductive substrate, and those of dispersion types comprising a photoconductive layer formed on a substrate and prepared by dispersing photoconductive particles in resin.

With the function-divided type, separated layers work dividedly to serve the basic functions of the photosensitive medium, i.e. generation of charge carriers and transport of the charges, to provide a photosensitive layer chargeable to a high surface potential and exhibiting great charge retentivity, high photosensitivity and stabilized repetition characteristics. Many compounds are known as charge generating materials and as charge transporting materials for use in the photosensitive media of the function-divided type. For example, various organic photoconductors of low molecular weight have been proposed for use in charge transporting layers. More specifically, U.S. Pat. No. 3,189,447 proposes use of 2,5-bis (p-diethylaminophenyl)-1,3,4-oxadiazole, but this compound has only a poor compatibility with binders and is liable to separate out as crystals. Further U.S. Pat. No. 3,820,989 discloses use of diarylalkane derivatives having a high compatibility with binders. However, the photosensitive medium containing the derivatives undergoes variations in sensitivity when repeatedly used, and is still required to be improved in initial sensitivity and residual potential characteristics, as well as in sensitivity variations and durability for repeated use.

SUMMARY OF THE INVENTION

The main objects of the present invention are to improve the foregoing drawbacks of the prior arts and to provide an electrophotographic photosensitive medium having a high photosensitivity and stable electrophotographic characteristics even at repeated use.

Stated more specially, the present invention provides an electrophotographic photosensitive medium comprising a styryl compound represented by the following formula (I) or (II);

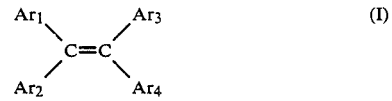

wherein $Ar_1$ is a substituted aryl group, and $Ar_2$, $Ar_3$, and $Ar_4$ are each an aryl group which may have a substituent;

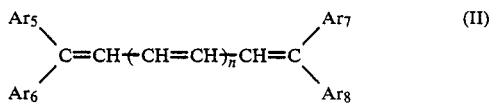

wherein both $Ar_5$ and $Ar_7$ are substituted aryl groups and $Ar_6$ and $Ar_8$ are each an aryl group which may have a substituent, and n is 0 or 1.

Further stated more specifically, the styryl compound of the formula (I) or (II) is incorporated in the charge transporting layer when the photosensitive medium is of the laminated function-divided type or in the photoconductive layer when the photosensitive medium is of the single-layer dispersion type, to give increased sensitivity and suppress light fatigue.

DETAILED DESCRIPTION OF THE INVENTION

Figure 1:
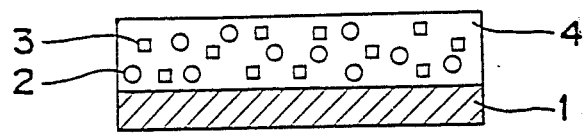
FIG. 1 is a diagram showing the structure of a dispersion-type photosensitive medium embodying the invention comprising a photosensitive layer formed on an electrically conductive substrate.

Examples of preferred styryl compounds of the present invention represented by the formula (I) are those having the following structual formula. These examples are in no way limitative.

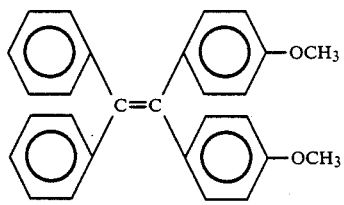

[1]

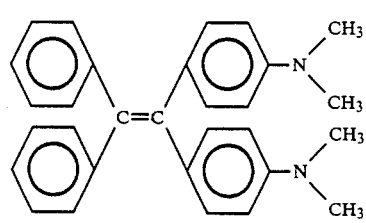 [2]
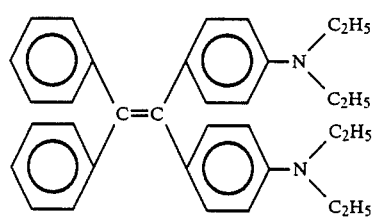 [3]
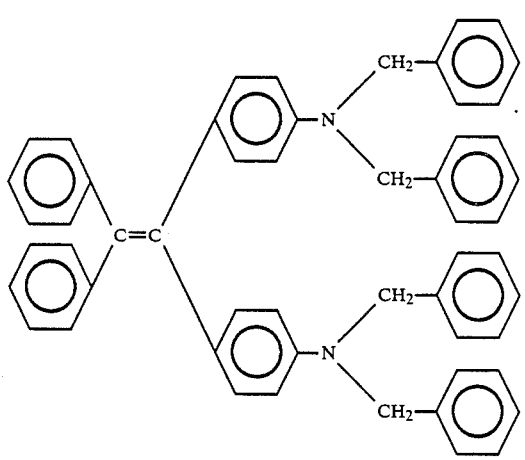 [4]
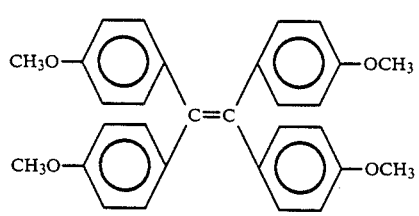 [5]
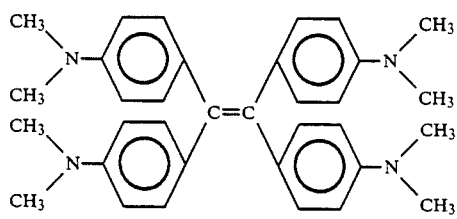 [6]
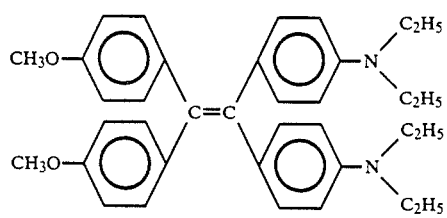 [7]

-continued
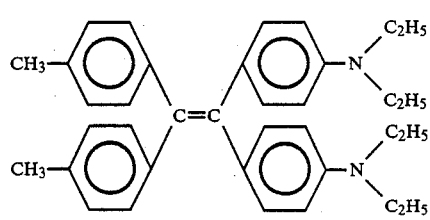 [8]
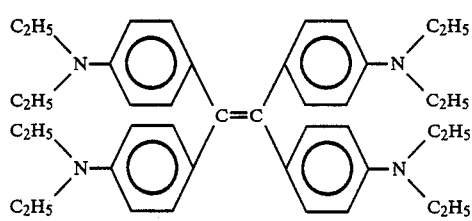 [9]
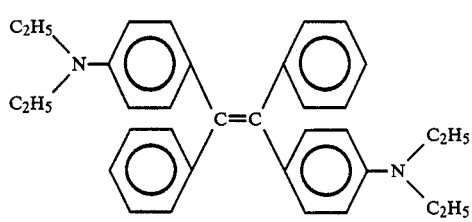 [10]
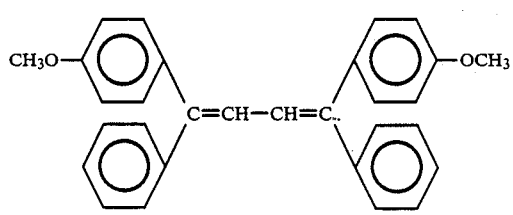 [11]
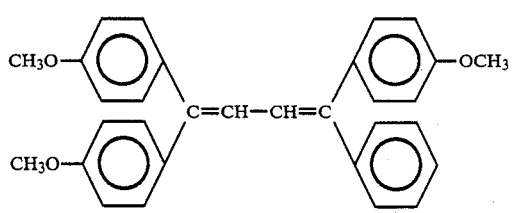 [12]
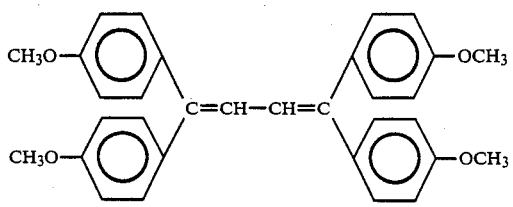 [13]
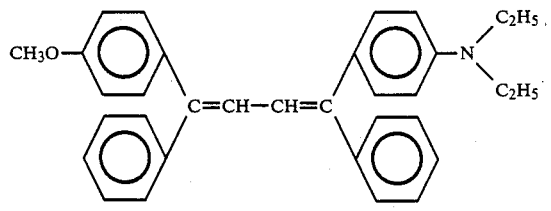 [14]

-continued
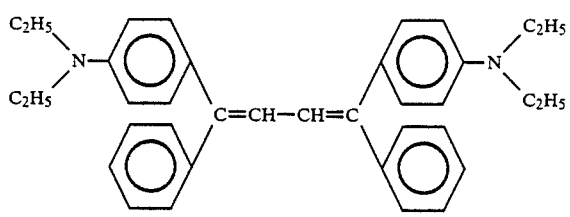 [15]
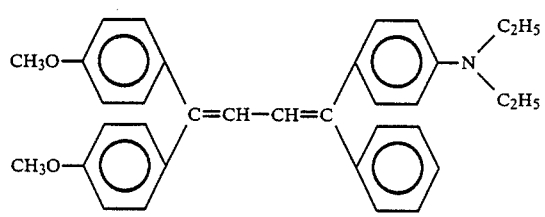 [16]
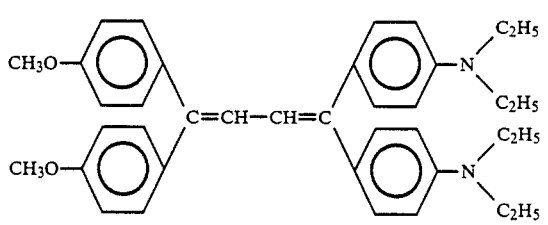 [17]
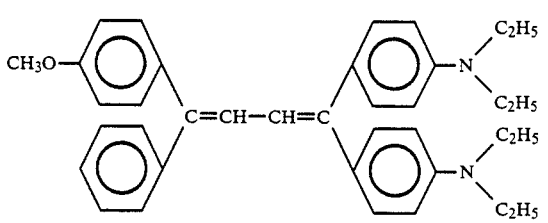 [18]
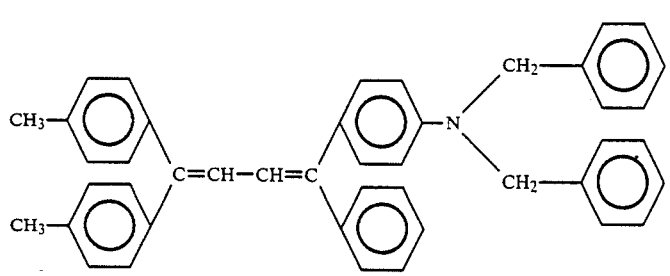 [19]
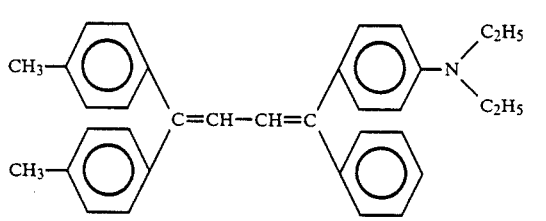 [20]
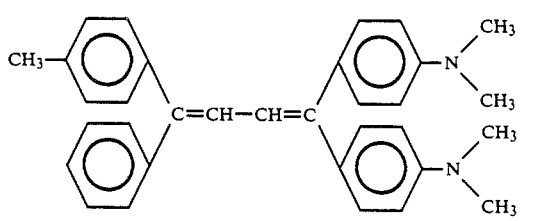 [21]

-continued
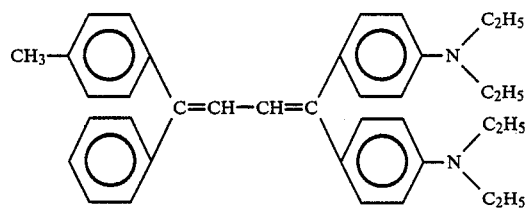 [22]
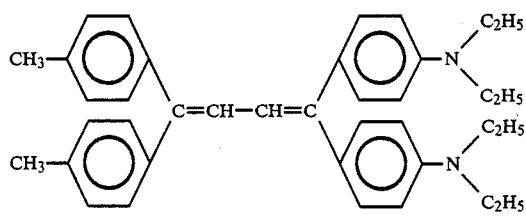 [23]
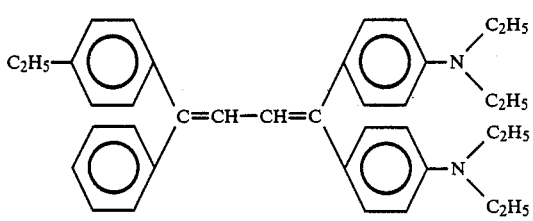 [24]
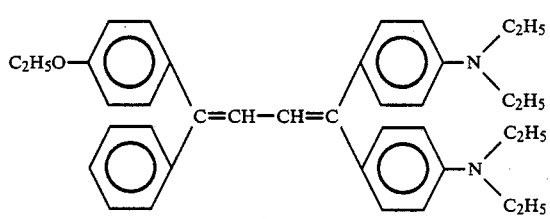 [25]
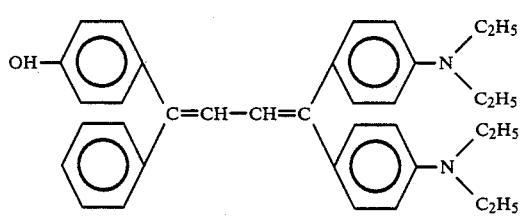 [26]
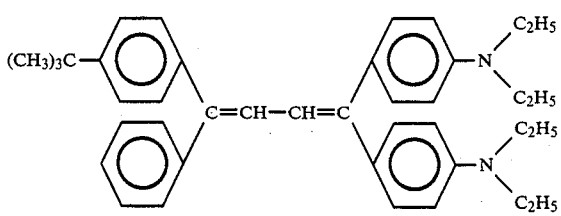 [27]
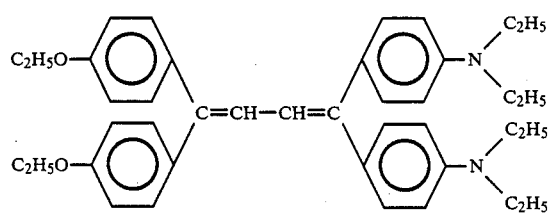 [28]

-continued
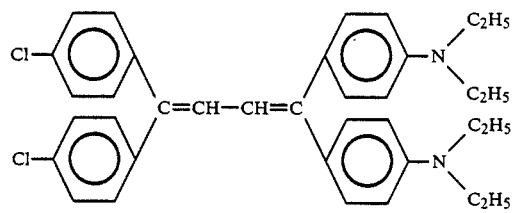 [29]
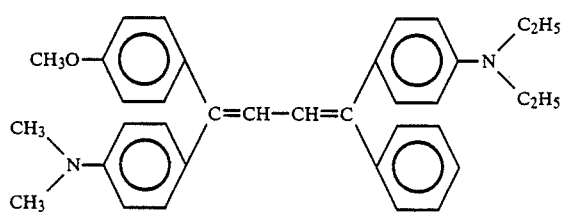 [30]
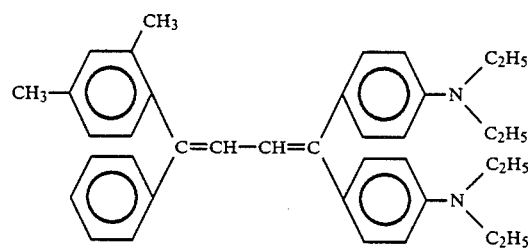 [31]
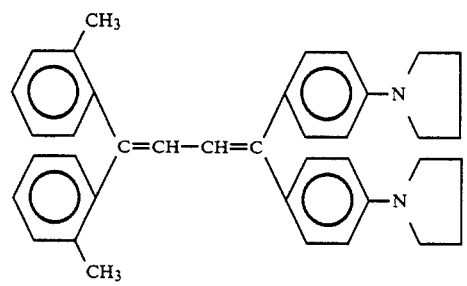 [32]
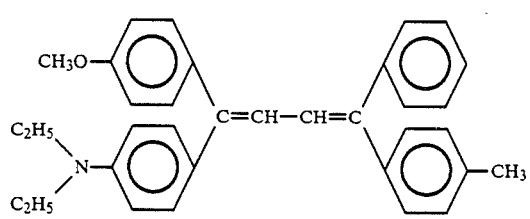 [33]
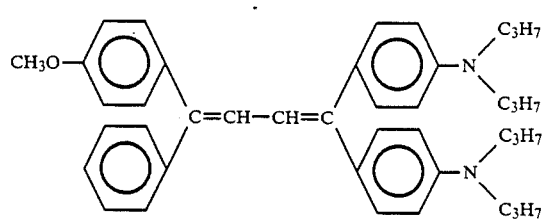 [34]
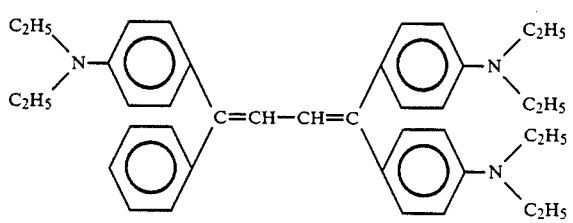 [35]

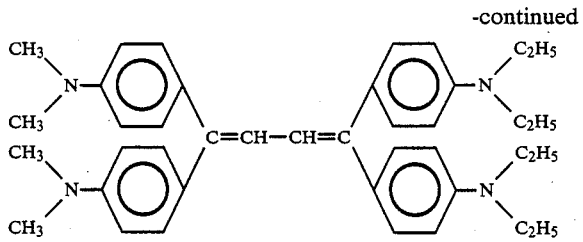
[36]
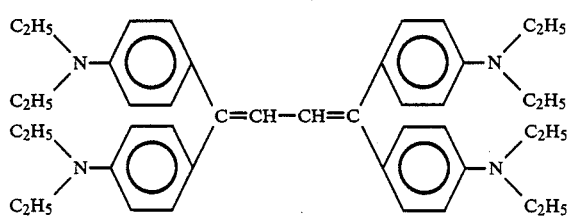
[37]
Example of preferred styryl compounds of the invention represented by the formula (II) are those having the following structual formula.
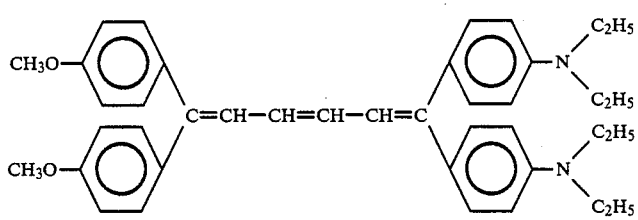
[38]
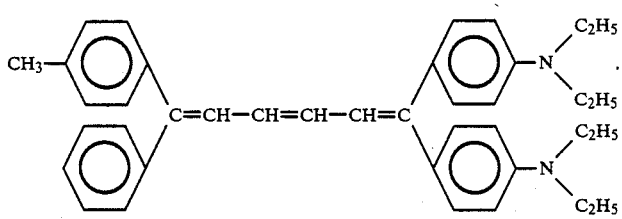
[39]
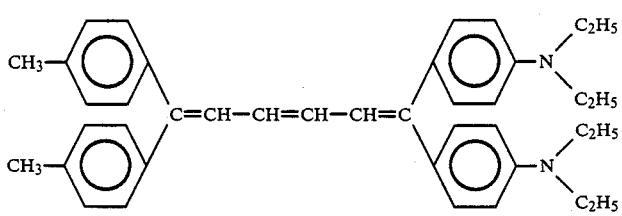
[40]
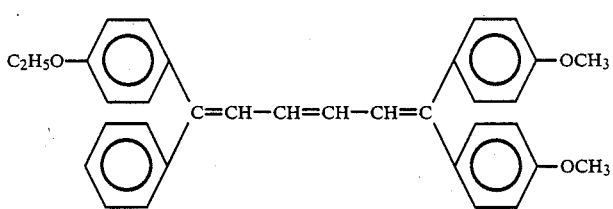
[41]
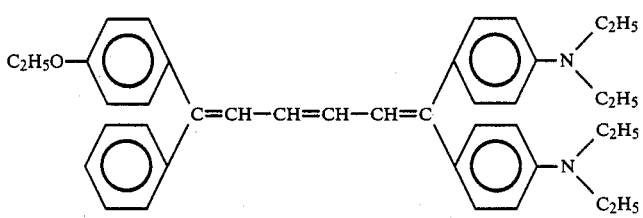
[42]

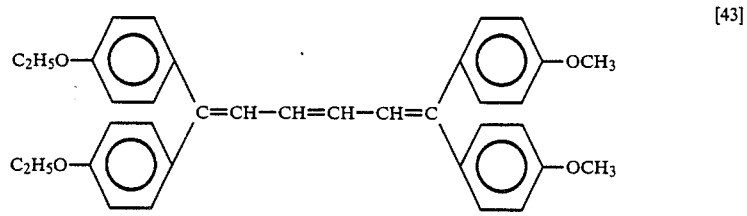
[43]
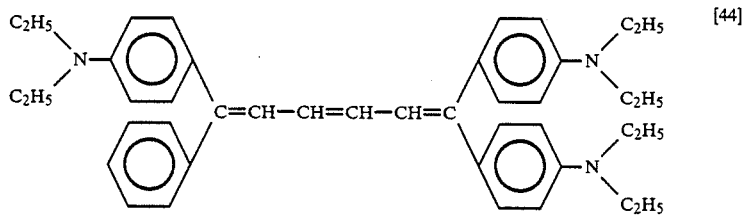
[44]
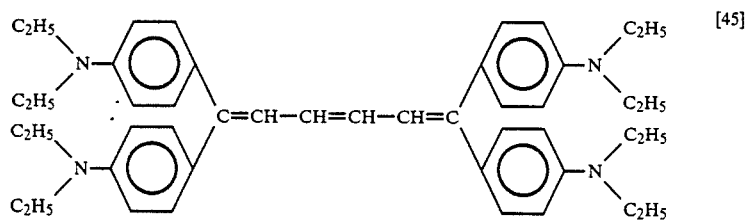
[45]
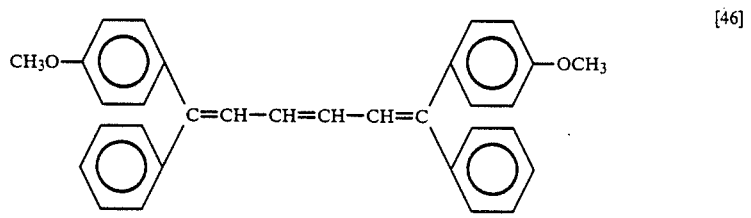
[46]
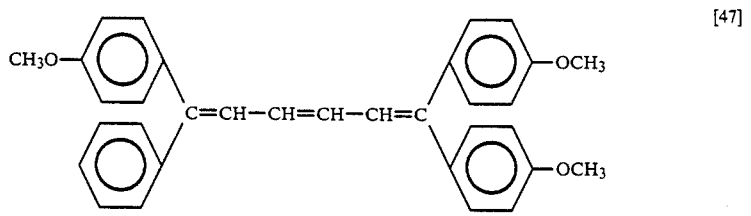
[47]
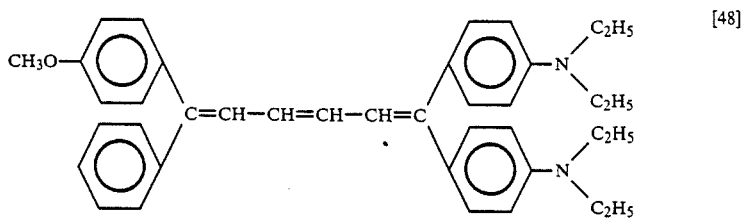
[48]
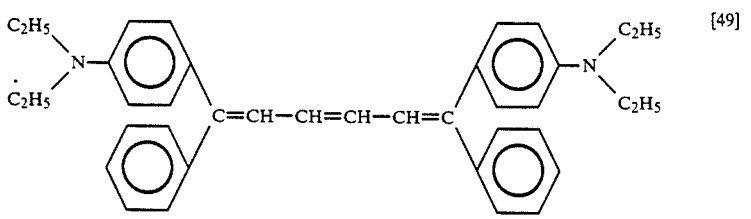
[49]

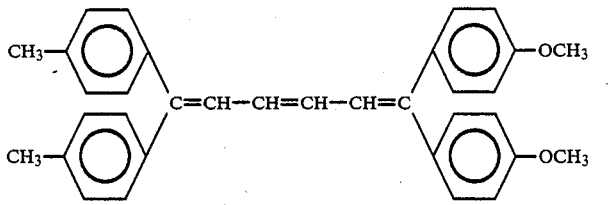

[50]

Some of the styryl compounds represented by the formula (I) or (II) are known and can be prepared by a known method. The compounds represented by the formula (I) are prepared, for example, by reacting a dichloromethane compound represented by the formula (A);

wherein $Ar_1$ and $Ar_2$ are as defined in the formula (I), with a diphenyl compound represented by the formula (B);

wherein $Ar_3$ and $Ar_4$ are as defined in the formula (I) in an organic solvent, such as benzene, toluene, ethanol, which is inert to the reaction, in the presence of a small amount of a basic catalyst, such as potassium hydroxide, at a reflux temperature.

The styryl compound represented by the formula (II) is prepared, for example, by condensing a phosphorus compound represented by the formula (C);

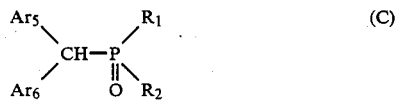

wherein $Ar_5$ and $Ar_6$ are as defined in the formula (II), and $R_1$ and $R_2$ are each alkyl, cycloalkyl, aralkyl or aryl which forms a phosphonium salt, with an acrolein compound represented by the formula (D);

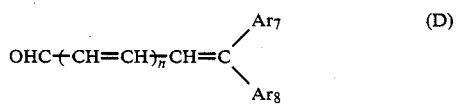

wherein $Ar_7$, $Ar_8$ and n is 0 or 1 are as defined in the formula (II). Preferably, each of $R_1$ and $R_2$ in the formula (C) representing the phosphorus compound is cyclohexyl, benzyl, phenyl, or lower alkyl.

Examples of reaction solvents useful for the foregoing process are hydrocarbons, alcohols and ethers, such as methanol, ethanol, isopropanol, butanol, 2-methoxyethanol, 1,2-dimethoxyethane, bis(2-methoxyethyl) ether, dioxane, tetrahydrofuran, toluene, xylene, dimethyl sulfoxide, N,N-dimethylformamide, N-methylpyrrolidone, 1,3-dimethyl-2-imidazolizinone, etc. Among these solvents, polar solvents such as N,N-dimethylformamide and dimethyl sulfoxide are especially preferable.

Examples of useful condensing agents are sodium hydroxide, potassium hydoroxide, sodium amide, sodium hydride, and alcoholates such as sodium methylate, potassium-t-butoxide, etc.

The reaction temperature can be selected from a wide range of from about 0° C. to about 100° C. and is preferably 10° C. to 80° C.

Alternatively, the styryl compound to be used in the invention can be prepared from a corresponding quaternary phosphonium salt, such as triphenylphosphonium salt, in place of the phosphorus compound of the formula (C), via phosphorylene obtained by the witting process and by the condensation of this compound with an aldehyde compound of the formula (D). The styryl compounds exemplified above may be used singly or in admixture.

FIGS. 1 to 5 schematically show examples of electrophotographic photosensetive media prepared with use of the styryl compound of the invention.

FIG. 1 shows a photosensitive medium comprising a photosensitive layer 4 formed on a substrate 1 and prepared from a photoconductive material 3 and a charge transporting material 2 as admixed with a binder. The styryl compound of the invention is used as the charge transporting material.

Figure 2:
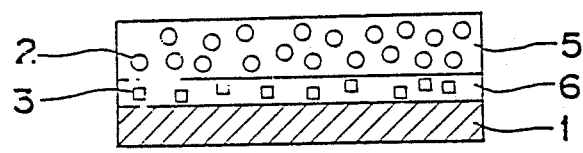
FIG. 2 is a diagram showing the structure of a photosensitive medium of the function-divided type comprising a charge generating layer and a charge transporting layer which are formed on an electrically conductive substrate.

FIG. 2 shows a photosensitive medium of the function-divided type comprising a charge generating layer 6 and a charge transporting layer 5 which are combined to serve as a photosensitive layer. The charge transporting layer 5 is formed over the surface of the charge generating layer 6. The styryl compound of the invention is incorporated in the charge transporting layer 5.

Figure 3:
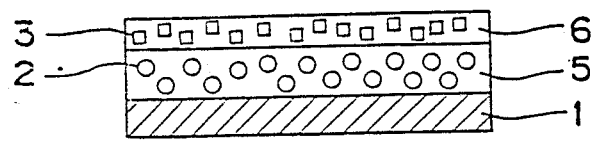
FIG. 3 is a diagram showing the structure of a medium of another photosensitive medium of the function-divided type comprising a charge generating layer and a charge transporting layer which are formed on an electrically conductive substrate.

FIG. 3 shows another photosensitive medium of the function-divided type which, like the one shown in FIG. 2, comprises a charge generating layer 6 and a charge transporting layer 5. In converse relation to the medium shown in FIG. 2, the charge generating layer 6 is formed over the surface of the charge transporting layer 5.

Figure 4:
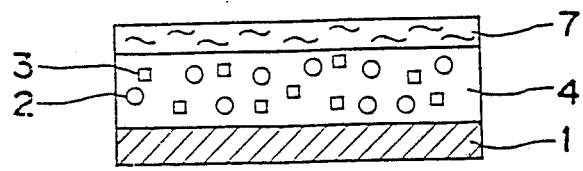
FIG. 4 is a diagram showing the structure of another dispersion-type photosensitive medium comprising a photosensitive layer and a surface protective layer formed on an electrically conductive substrate.

The medium shown in FIG. 4 comprises the one shown in FIG. 1 and a surface protective layer 7 formed over the surface of the photosensitive layer 4. The photosensitive layer 4 may be separated into a Charge generating layer 6 and a charge transporting layer 5 to provide a photosensitive medium of the function-divided type.

Figure 5:
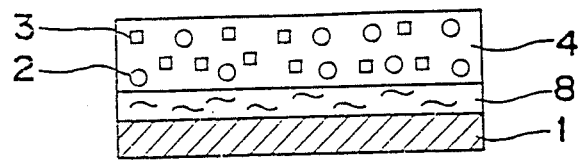
FIG. 5 is a diagram showing the structure of another dispersion-type photosensitive medium comprising a photosensitive layer and an intermediate layer formed on an electrically conductive substrate.

FIG. 5 shows a photosensitive medium having the same construction as the one shown in FIG. 1 except that an intermediate layer 8 is interposed between the substrate 1 and the photosensitive layer 4. The intermediate layer 8 serves to give enhanced adhesion, afford improved coatability, protect the substrate and assure injection of charges from the substrate into the photoconductive layer 12 with improved effectiveness. Polyimide resin, polyester resin, polyvinyl butyral resin, casein, etc. are useful for forming the intermediate layer. The photosensitive layer of the medium may also be modified to the function divided type.

The photosensitive medium of the present invention for use in electrophotography can be prepared by dissolving or dispersing the styryl compound of the formula (I) or (II) and a binder in a suitable solvent to obtain a coating composition, applying the composition to an electrically conductive substrate and drying the coating. When required, a photoconductive material and an electron-attracting compound, or a sensitizing dye and other pigments can be admixed with the coating composition. The dried coating, i.e. photosensitive layer, is usually 5 to 30 μm, preferably 6 to 20 μm, in thickness.

More specifically, the photosensitive medium of the function-divided type having the same structure as the medium of FIG. 2 described, i.e. having a charge generating layer formed on an electrically conductive substrate and a charge transporting layer on the layer, can be prepared by coating the substrate with a charge generating material by vacuum deposition or by coating the substrate with a composition obtained by dispersing the material in a suitable solvent which may contain a binder resin dissolved therein when so required and drying the coating, to form the charge generating layer, and further coating this layer with a solution of the styryl compound serving as a charge transporting material and binder resin in a suitable solvent. The charge generating layer thus formed is 50Å to 1 μm, preferably 100Å to 5000Å, in thickness, while the charge transporting layer is 3 to 30 μm, preferably 5 to 20 μm, in thickness. It is suitable that the charge transporting layer contains the styryl compound in an amount of 0.02 to 2 parts by weight, more suitably 0.03 to 1.3 parts by weight, per part by weight of the binder resin. The styryl compound may be used in combination with some other charge transporting material. When this material is a high-molecular-weight charge transporting material which itself is serviceable as a binder, the other binder can be dispensed with. The photosensitive medium, like the one shown in FIG. 3, may be so constructed that the charge transporting layer is provided on the electrically conductive substrate, with the charge generating layer formed on the transporting layer.

The photosensitive medium of the dispersion type having the same structure as the medium of FIG. 1 described, i.e. having a photoconductive layer on an electrically conductive substrate, is prepared by dispersing a finely divided photoconductive material in a solution of the styryl compound and a binder resin, coating the conductive substrate with the dispersion and drying the coating to form the photoconductive layer. The photoconductive layer thus formed is 3 to 30 μm, preferably 5 to 20 μm, in thickness. If the photoconductive material is used in too small an amount, lower sensitivity will result, whereas presence of an excess of the material leads to impaired chargeability or gives reduced strength to the photoconductive layer. It is desirable that the photoconductive layer contains the photoconductive material in an amount of 0.01 to 2 parts by weight, more desirably 0.05 to 1 part by weight, per part by weight of the binder resin. The amount of styryl compound is preferably 0.01 to 2 parts by weight, more preferably 0.02 to 1.2 parts by weight, per part by weight of the binder resin. The styryl compound may be used conjointly with a high-molecular-weight photoconductive material, such as polyvinylcarbazole, which is serviceable as a binder in itself, or with some other charge transporting material such as hydrazone.

Example of charge generating materials useful for the present photosensitive medium of the function-divided type and examples of photoconductive materials useful for the dispersion-type medium are organic substances such as bisazo dyes, triarylmethane dyes, thiazine dyes, oxazine dyes xanthene dyes, cyanine coloring agents, styryl coloring agents, pyrylium dyes, azo pigments quinacridone pigments, indigo pigments, perylene pigments, polycyclic quinone pigments, bisbenzimidazole pigments, indanthrone pigments, squalylium pigments and phthalocyanine pigments; and inorganec substances such as selenium, selenium-tellurium, selenium arsenic, cadmium sulfide and amorphous silicon. Any other material is also usable insofar as it generates charge carriers very efficiently upon absorption of light.

The binder to be used is any of known thermoplastic resins or thermosetting resins having electrically insulating properties, light-curable resins and photoconductive resins. Although not limitative, examples of suitable binders are thermoplastic binders such as saturated polyester resin, polyamide resin, acrylic resin, ethylene-vinyl acetate copolymer, ion-crosslinked olefin copolymer (ionomer), styrene-butadiene block copolymer, polyallylate, polycarbonate, vinyl chloride-vinyl acetate copolymer, cellulose ester, polyimide and styrol resin; thermosetting binders such as epoxy resin, urethane resin, silicone resin, phenolic resin, melamine resin, xylene resin, alkyd resin and thermosetting acrylic resin; light-curable resins; photoconductive resins such as poly-N-vinylcarbazole, polyvinylpyrene and polyvinylanthracene; etc. These binders are usable singly or in admixture. The electrically insulating resin is preferably at least $1 \times 10^{12}$ ohm-cm in volume resistivity. More preferable among the foregoing examples are polyester resin, polycarbonate and acrylic resin.

In preparing electrophotographic photosensitive media according to the present invention, the binder may be used conjointly with plasticizers such as paraffin halide, polybipheyl chloride, dimethylnaphthalene, diburlyl phthalate and o-terphenyl; election-attracting sensitizers such as chloranil, tetracyanoethylene, 2,4,7-trinitro-9-fluorenone, 5,6-dicyanobenzoquinone, tetracyanoquinodimethane, tetrachloroacetic anhydride and 3,5,-dinitrobenzoic acid; and sensitizers such as Methyl Violet, Rhodamine B, cyanine dye, pyrylium salt and thiapytrlium salt.

The photosensitive medium thus prepared for use in electrophotography may have an adhesion or intermediate layer, or a surface protective layer when so required as already stated with reference to FIGS. 4 or 5.

As described above, the styryl compound of the present invention is easy to prepare, can be incorporated into photosensitive media of the function-divided type or dispersion type and is usable in combination with various charge generating materials and binder resins, or conjointly with other charge transporting materials in some cases. Accordingly, the electrophotographic photosensitive medium having the present styryl compound incorporated therein is very easy to produce, finds wide use, has outstanding repetition characteristics with light fatigue effectively prevented by the styryl compound, exhibits improved sensitivity and is dimenished in surface potential variations.

The use of the present compound inhibits the light fatigue of the photosensitive medium effectively and renders the medium repeatedly usable with a diminished surface potential reduction, reduced rise of residual potential and lesser sensitivity variation, enabling the medium to exhibit stable electrophotographic characteristics and high sensitivity to afford sharp copy images.

It is important to notice that the photosensitive medium comprising a styryl compound according to the invention can be also applied to both PPC and a laser printer.

PREPARATION EXAMPLE 1

Preparation of Styryl Compound (2)

Diphenyldichloromethane (7.1 parts by weight) was reacted with 7.6 parts by weight of bisdimethylaminophenylmethane in 200 parts by weight of ethanol in the presence of 3.7 parts by weight of potassium hydroxide at a reflux temperature for 5 hours.

The reaction mixture was filtered hot and then cooled, giving 10.3 parts by weight of scalelike milk-white particles (yield 82). The product was purified by crystallization from ethanol, affording milk-white crystals melting at 93 to 95.

The purified product was subjected to elementary analysis with the following result.

|  | C (%) | H (%) | N (%) |
| --- | --- | --- | --- |
| Calcd. | 86.12 | 7.18 | 6.70 |
| Found: | 86.05 | 7.20 | 6.75 |

The present invention will be described below in greater detail with reference to the following example, in which the part are all by weight.

PREPARATION EXAMPLE 2

Preparation of Styryl Compound (18)

Tetraetlyldiamino benzophenone was reacted with magnesium metal and methyl iodide (grignard reaction) to give tetraethyl-diaminodiphenylethylene by recrystalligation from ether. The Vilsmeier solution prepared with 3 g of phosphorus oxychloride and 2 g of dimethylformamide was added to the solution of 2.0 g of the resulting ethylene compound. The resulting solution was stirred, and reacted for about 2 hours and then still reacted for 2 hours at the 50° C.-higher temperature. The obtained solution was put into ice-water containing sodium hydroxide to be neutralized. Then, tetraethyl-diamino-diphenyl-acrolein separated outin crystals, which were filtered. 3.34 g of phosphonate having the formula; and 3.6 g of tetraethyldiamino-diphenyl-acrolein having the formula;

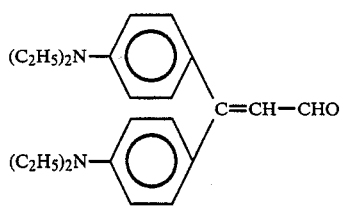

were dossoved in 30 ml of dimethylformamide. The suspension solution containing 5 g of potassium-t-butoxido in 70 ml of dimethylfomamide was dropped into the above solution at the temperature of 30°–40° C. And then, the mixed solution was stirred at the room temperature for 8 hours and allowed to stand overnight. The resulting mixed solution was put into 900 ml of ice-water to be neutralized by dilute hydrochloric acid. After about 30 minutes, separated crystals were filtered.

The filtered products were washed with water and purified by recrystallization from acetonitrile, affording 4.2 g of needle crystals (yield, 83%). The result of elementary analysis was shown below;

|  | C (%) | H (%) | N (%) |
| --- | --- | --- | --- |
| Colcd.: | 87.75 | 6.72 | 5.53 |
| Found: | 87.69 | 6.78 | 5.50 |

EXAMPLE 1

Two parts of chlorodianblue represented by the formula (III) given below, 1 part of polyester resin (Vylon 200, product of Toyobo Co., Ltd.) and 100 parts of methyl ethyl ketone were placed into a ball mill pot and treated for 24 hours for dispersion to obtain a photosensitive coating composition, which was then applied to an aluminum substrate and dried to form a charge generating layer, 0.3 μm in thickness, on the substrate.

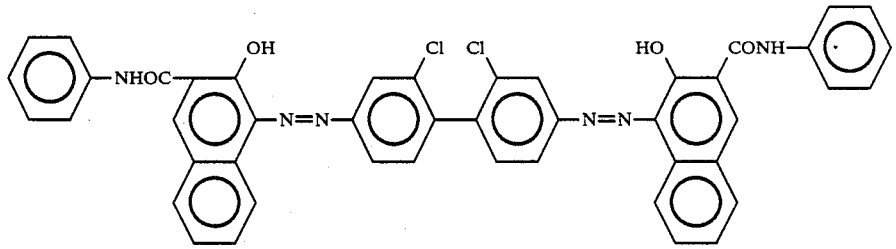

The charge generating layer was further coated with a solution of 10 parts of the styryl compound (2) and 10 parts of polycarbonate resin (pamlite K-135=00, product of Teijin Kasei Co., Ltd.) in 80 parts of tetrahydrofuran to form a charge transporting layer which was 15 μm in thickness when dried, whereby a photosensitive medium was prepared.

The photosensitive media thus prepared was incorporated into a commercial electrophotographic copying machine (EP-450z, product of MINOTA CAMERA CO., LTD.) and tested with application of a voltage of −6 kv to the d.c. power supply to measure the initial surface potential Vo (V), the amount of exposure required for Vo to reduce to half of $V_o$ ($E_{\frac{1}{2}}$(lux. sec)), and the potential decay rate $DDR_1$ (%) and the residual potential $V_R$ (V) when the medium was allowed to stand in the dark for 1 second after charging.

EXAMPLES 2~4

Photosensitive media were prepared with the same structure and in a similar way as Example 1 except that the styryl compound (3), (4), (7) for the charge transporting layer were used respectively instead of the styryl compound (2). The photosensitive media thus obtained were tested in the same manner is in Example 1 to measure Vo, $E_{\frac{1}{2}}$, $DDR_1$ and $V_R$.

EXAMPLE 5

Photosensitive media were prepared with the same structure and in a similar way as the medium 1 in Example 1 with the exception of using a disazo pigment represented by the formula (IV) below in place of chlorodianblue for the charge generating layer and further using the styryl compound (9) for the charge transporting layer instead of the styryl compound (2).

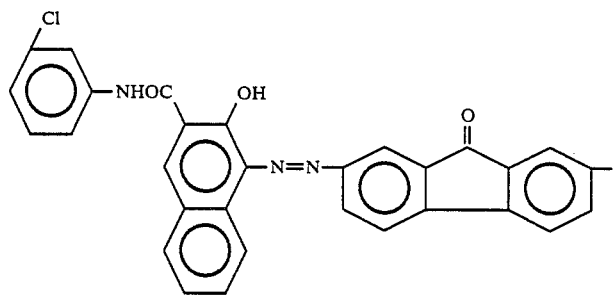

EXAMPLES 6~10

Photosensitive media were prepared with the same structure and in a similar way as Example 5 except that the styryl compounds (12), (15), (17), (18) and (22) for the charge transporting layer were used respectively instead of the styryl compound (9). The photosensitive media thus obtained in Example 6~10 were tested in the same manner as in Example 1 to measure $V_o$, $E_{\frac{1}{2}}$, $DDR_1$, $V_R$.

EXAMPLE 11

Photosensitive medium was prepared with the same structure and in a similar way as Example 1 with the exception of using dibromo anthanthrone represented by the formula (V) below in place of chlorodian blue for the charge generating layer and further using the styryl compound (25) for the charge transporting layer instead of the styryl compound (2).

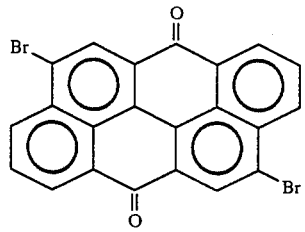

EXAMPLES 12 and 13

Photosensitive media were prepared with the same structure and in a similar way as Example 11 except that the styryl compound (27) and (28) for the charge transporting layer were used respectively instead of the styryl compound (25).

EXAMPLE 14

Copper phthalocyanine (50 parts) and 0.2 parts tetranitro copper phthalocyanine were dissolved in 500 parts of 98% concentrated sulfuric acid with full stirring. The solution was placed into 5000 parts of water to cause a photoconductive composition of copper phthalocyanine and tetranitro copper phthalocyanine to seprete out, followed by filtration, washing with water and drying in a vacuum at 120° C.

The resulting composition (10 parts), 22.5 parts of thermosetting acrylic resin (Acrydic A 405, product of Dainippon Ink & Chemicals Inc.), 7.5 parts of melamine resin (Super Beckamine J820, product of Dainippon Ink & Chemicals Inc.) and 15 parts of styryl compound (18) were placed into a ball mill pot along with 70 parts of a solvent mixture of methyl isobutyl ketone and cellosolve acetate in equal amounts. These ingredients were treated for 48 hours for dispersion to obtain a photoconductive coating composition, which was then applied to an aluminum substrate and dried to obtain a coating, about 15 μm in thickness, whereby a photosensitive medium was prepared.

EXAMPLES 15~20

Photosensitive media were prepared with the same structure and in a similar way as Example 14 except that the styryl compound (22), (23), (31), (38), (42) and (48) for the charge transporting layer were used respectively instead of the styryl compound (18).

The Vo, $E_{\frac{1}{2}}$, $DDR_1$ and $V_R$ values of the photosensitive media and thus obtained were measured in the same manner as in Example 1 except that the voltage applied to the d.c. power supply was +6 kV.

Table 1 shows the $V_o$, $D_{\frac{1}{2}}$, $DDR_1$ and $V_R$ measurements of the photosensitive media obtained in Examples 1 to 20.

COMPARATIVE EXAMPLES 1~3

Photosensitive media were prepared with the same structure and in a similar way as the medium of Example 14 except that the compounds of the formulae (VI) and (VII) and (VIII) given below were respectively used for the charge transporting layer in place of the styryl compound (18).

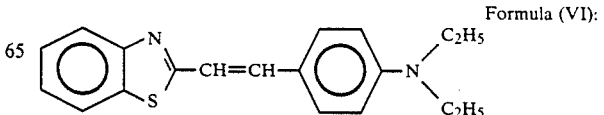

Formula (VI):

-continued

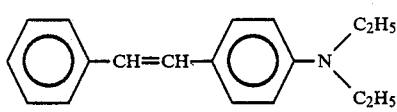
Formula (VII)

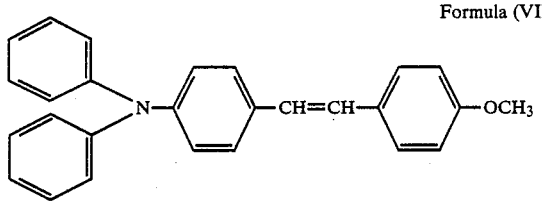
Formula (VIII)

The $V_o$, $E_{\frac{1}{2}}$, $DDR_1$ and $V_R$ values of the photosensitive media thus prepared were measured in the same manner as in Example 13. Table 1 shows the results.

TABLE 1

| | $V_o$ (V) | $E_{\frac{1}{2}}$ (lux sec) | $DDR_1$ (%) | $V_R$ (V) |
|---|---|---|---|---|
| E1* | −620 | 5.8 | 3.8 | 5 |
| E2 | −630 | 5.0 | 2.9 | 7 |
| E3 | −615 | 4.8 | 4.5 | 5 |
| E4 | −620 | 4.6 | 3.9 | 5 |
| E5 | −620 | 3.5 | 2.7 | 5 |
| E6 | −630 | 2.3 | 2.8 | 6 |
| E7 | −620 | 1.9 | 3.0 | 4 |
| E8 | −600 | 2.2 | 4.0 | 6 |
| E9 | −620 | 1.8 | 3.4 | 3 |
| E10 | −630 | 1.9 | 2.8 | 4 |
| E11 | −630 | 3.2 | 2.9 | 4 |
| E12 | −620 | 2.8 | 3.5 | 3 |
| E13 | −630 | 3.3 | 3.0 | 5 |
| E14 | +620 | 2.0 | 13.0 | 8 |
| E15 | +610 | 2.2 | 14.0 | 8 |
| E16 | +600 | 2.5 | 13.5 | 6 |
| E17 | +610 | 2.2 | 13.8 | 8 |
| E18 | +605 | 2.5 | 13.0 | 6 |
| E19 | +600 | 2.4 | 13.5 | 8 |
| E20 | +600 | 2.7 | 12.8 | 6 |
| C1** | +600 | 14.5 | 12.0 | 15 |
| C2 | +600 | 13.0 | 11.3 | 15 |
| C3 | +590 | 6.4 | 12.7 | 13 |

*E represents Example
**C represents Comparative Example

What is claimed is:

1. A photosensitive medium of the function divided type for electrophotography having a charge generating layer and a charge transporting layer which are formed on an electrically conductive substrate, wherein the charge transporting layer comprises a binder resin and a styryl compound represented by the following Formula (I):

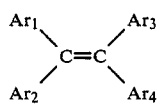

wherein $Ar_1$ is an aryl group having a substituent which is an alkyl group, an alkoxy group, a disubstituted amino group, or a halogen atom and $Ar_2$, $Ar_3$, and $Ar_4$ are each an aryl group or a substituted aryl group.

2. A photosensitive medium of the function divided type for electrophotography having a charge generating layer and a charge transporting layer which are formed on an electrically conductive substrate, wherein the charge transporting layer comprises a binder resin and a styryl compound represented by the following formula (II):

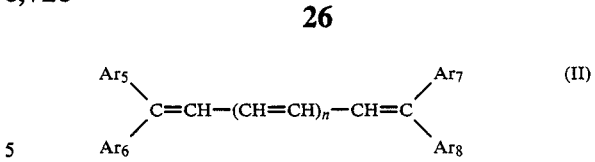

wherein both $Ar_5$ and $Ar_7$ are each an aryl group having a substituent which is an alkyl group, an alkoxy group, a disubstituted amino group, or a halogen atom, $Ar_6$ and $Ar_8$ are an aryl group or a substituted aryl group, and n is 0 or 1.

3. A photosensitive medium of the dispersion type having a photoconductive layer which comprises a binder resin, a charge generating material, and a charge transporting material formed on an electrically conductive substrate, wherein the charge transporting material comprises a styryl compound represented by the following formula (I):

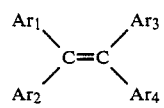

wherein $Ar_1$ is an aryl group having a substituent which is an alkyl group, an alkoxy group, a disubstituted amino group, or a halogen atom and $Ar_2$, $Ar_3$, and $Ar_4$ are each an aryl group or a substituted aryl group.

4. A photosensitive medium of the dispersion type having a photoconductive layer which comprises a binder resin, a charge generating material, and a charge transporting material formed on an electrically conductive substrate, wherein the charge transporting material comprises a styryl compound represented by the following formula (II):

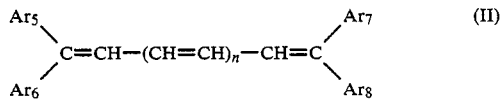

wherein both $Ar_5$ and $Ar_7$ are each an aryl group having a substituent which is an alkyl group, an alkoxy group, a disubstituted amino group, or a halogen atom, $Ar_6$ and $Ar_8$ are each an aryl group or a substituted aryl group, and n is 0 or 1.

5. A photosensitive medium of the claim 1 or the claim 2, in which the charge generating layer comprises azo pigments.

6. A photosensitive medium of the claim 1 or the claim 2, in which the charge generating layer comprises phthalocyanine pigments.

7. A photosensitive medium of the claim 1 or the claim 2, in which the charge generating layer comprises polycyclic quinone pigments.

8. A photosensitive medium of the claim 1 or the claim 2, in which the charge transporting layer is formed on the charge generating layer.

9. A photosensitive medium of the claim 1 or the claim 2, in which the charge generating layer has 50Å ~ 1 μm in thickness.

10. A photosensitive medium of the claim 1 or the claim 2, in which the charge transporting layer has 3~30 μm in thickness.

11. A photosensitive medium of the claim 1 or the claim 2, in which an intermediate layer is formed on the electrically conductive substrate.

12. A photosensitive medium of the claim 1 or the claim 2, which has a surface protective layer.

13. A photosensitive medium of the claim 3 or the claim 4, in which the charge generating material comprises phthalcyanine pigments.

* * * * *